Nov. 7, 1933.   H. D. MILES ET AL   1,933,819
VACUUM DRUM DRIER
Filed Oct. 27, 1931   4 Sheets-Sheet 3
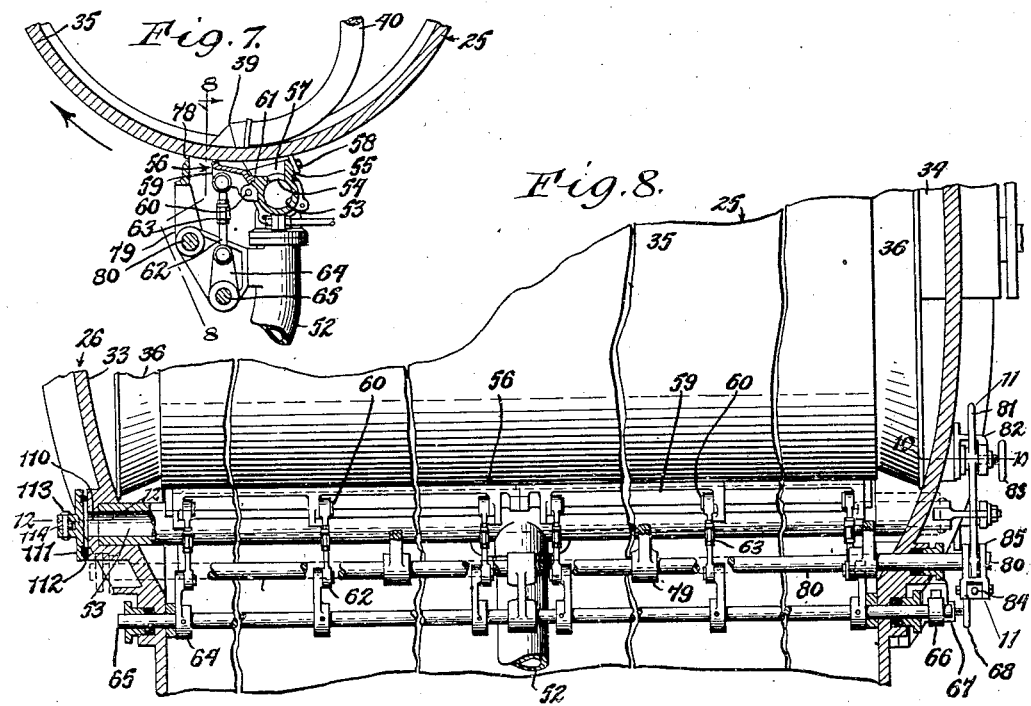
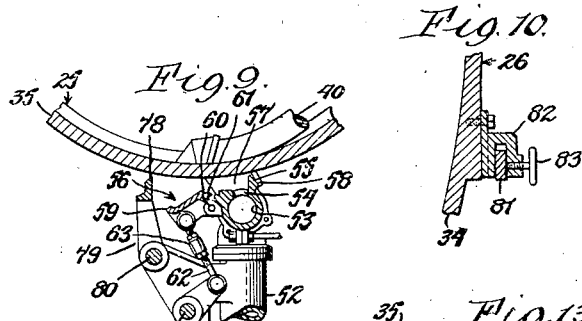
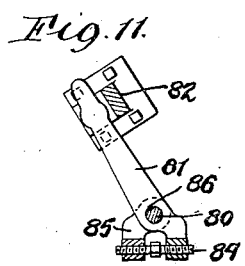
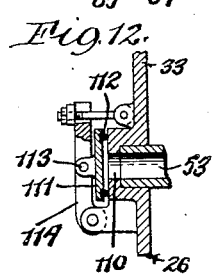
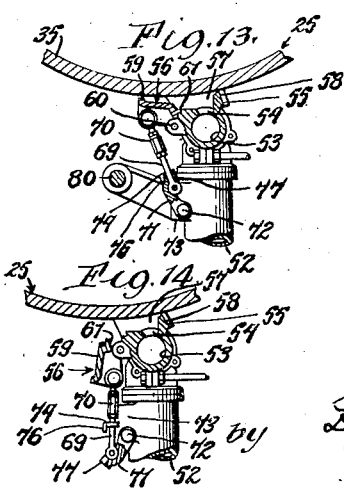
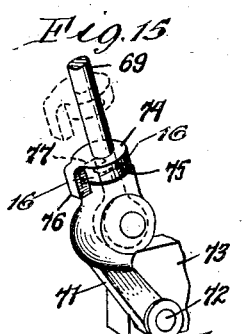

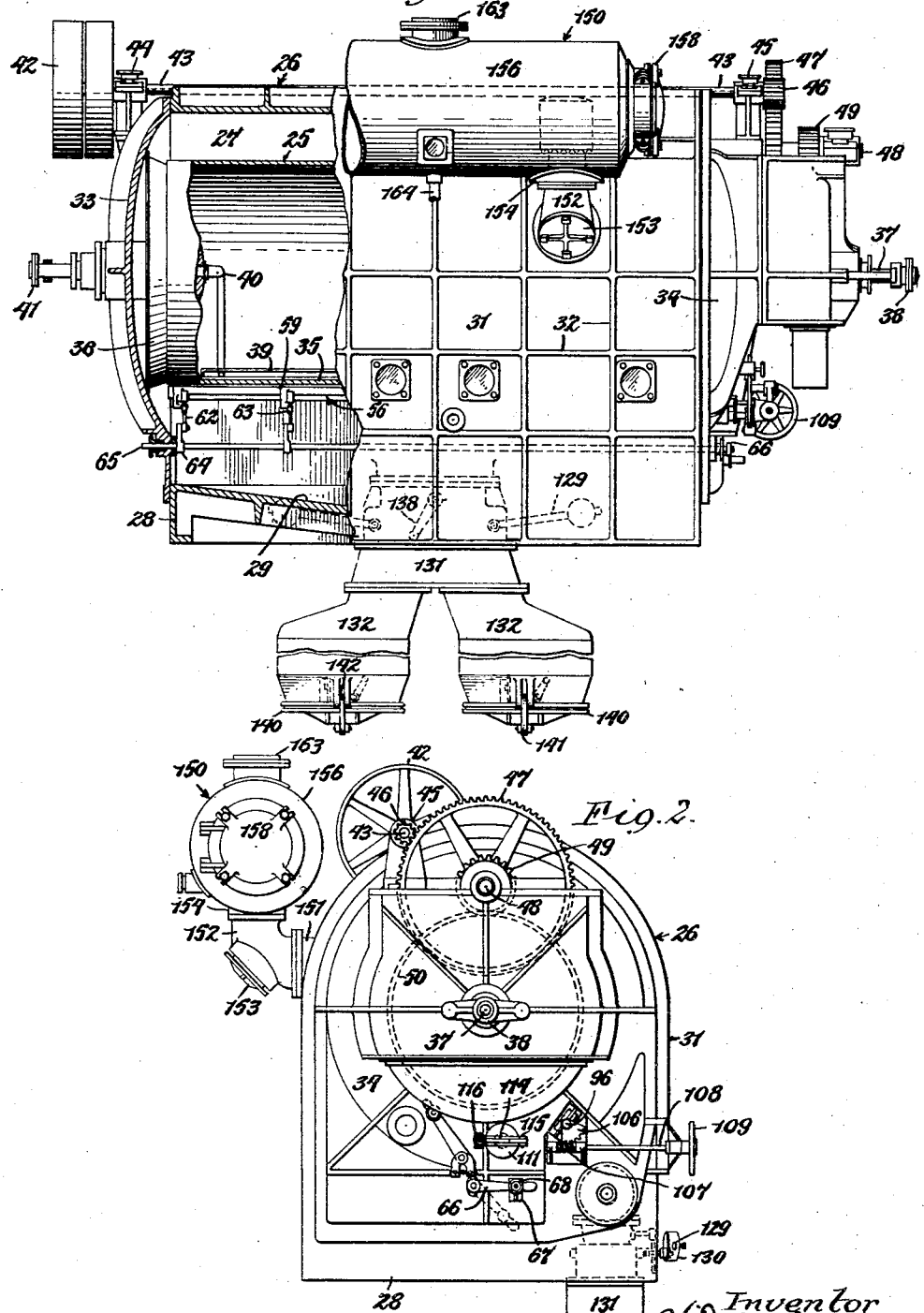

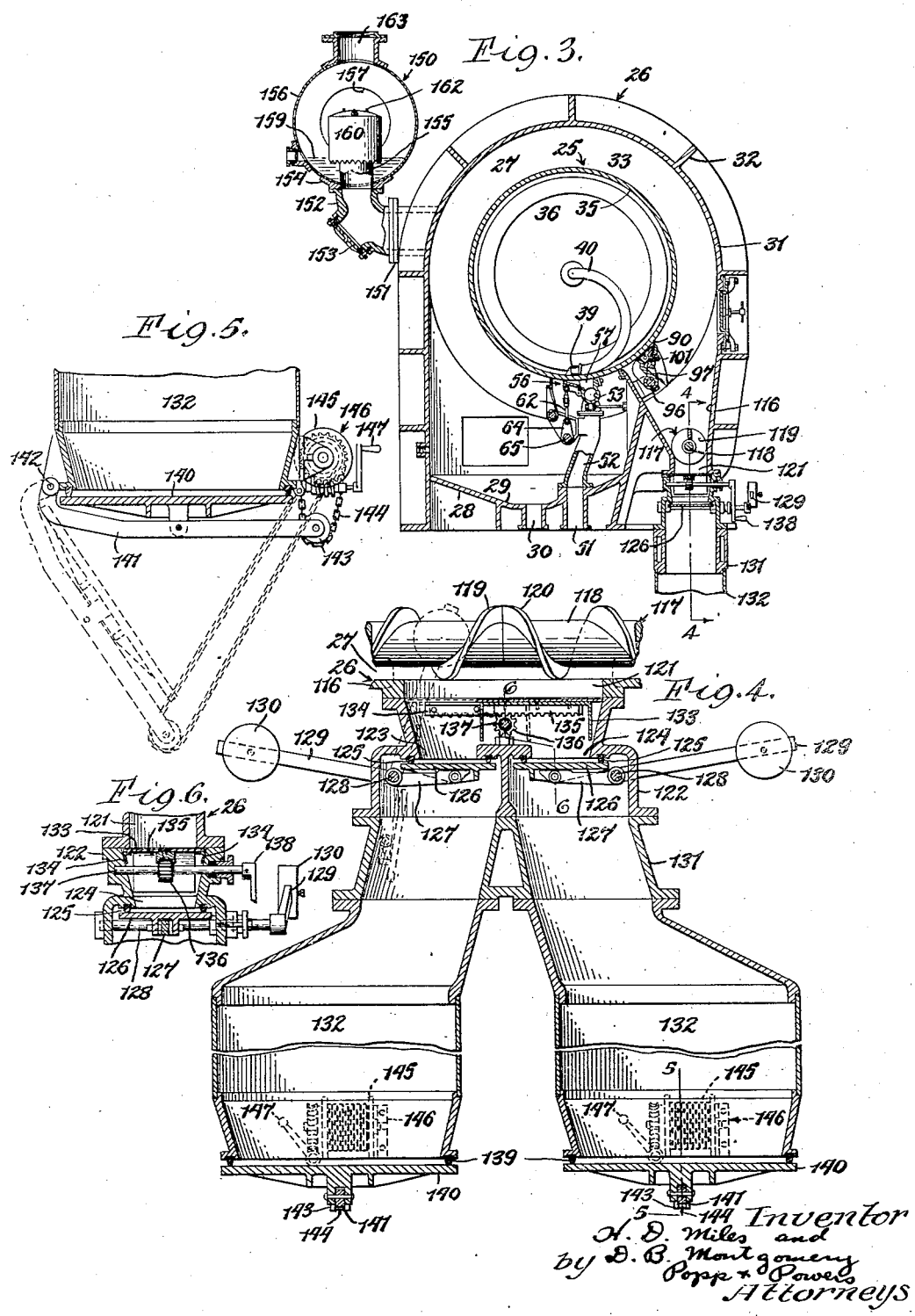

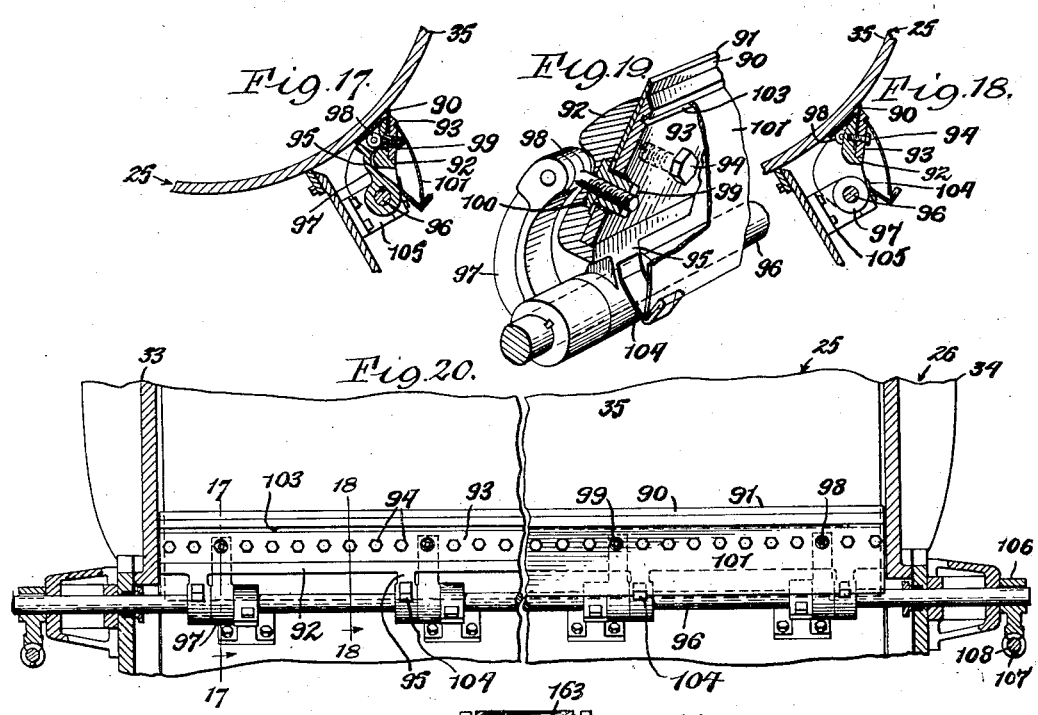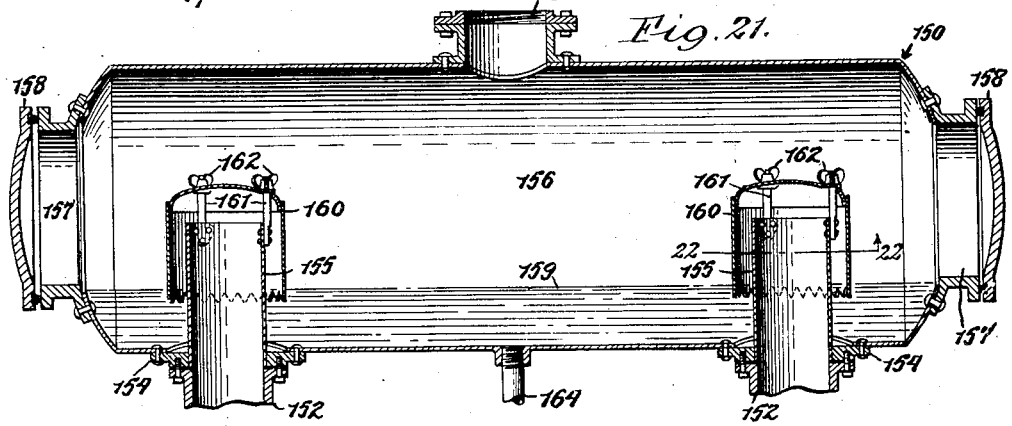

Patented Nov. 7, 1933

1,933,819

UNITED STATES PATENT OFFICE 1,933,819

VACUUM DRUM DRIER

Henry D. Miles, Buffalo, and Duncan Bain Montgomery, Gardenville, N. Y., assignors to Buffalo Foundry and Machine Co., Buffalo, N. Y., a corporation of New York Application October 27, 1931, Serial No. 571,408

15 Claims. (Cl. 159—12)

This invention relates to a vacuum drum drier and more particularly to a drier which is intended for use in drying materials, such as milk, at sub-atmospheric pressures, in which the liquid is fed to the exterior of an encased heated drum by means of a pan, carried around the heated drum and scraped off in a dried condition and deposited in a conveyor which conveys it to a valved outlet by means of which the dried material can be removed without breaking the vacuum around the drum. The vapors from the casing surrounding the drum are withdrawn and sub-atmospheric pressures maintained by suitable means.

One of the objects of the present invention is to provide a feeding pan arranged within the shell which surrounds and maintains a vacuum around the heated drying drum which pan is so organized that the drum dips into the pan and picks up the liquid to be dried and is so constructed that it can be quickly dumped or adjusted from the exterior of the casing without breaking the vacuum and entering the drying chamber. This permits the contents of the pan to be dumped in the event of interrupted operation or so that if there is an accumulation of solid lumps in the pan these can be removed without entering the chamber.

Another purpose of the present invention is to provide a scraping knife which removes the material from the drum and which can be actuated and adjusted from the exterior of the casing without breaking the vacuum and which is also so designed as to eliminate all the connecting links and rods of present driers of this character on which the dried material may rest or fall. By the elimination of such connecting links or rods the drier is more easily kept in a clean and sanitary condition and thereby enable it to be more conveniently used for drying food stuffs for human consumption.

Another purpose is to provide a double valve through which the dried materials are discharged into receivers without breaking the vacuum within the drier. This double valve, in connection with two receivers, enables the convenient withdrawal of the dried materials without in any way interfering with the operation of the drier, the dried materials being discharged into one receiver while the other receiver is being emptied of its dried contents.

A still further purpose is to provide a dust collector or separator which collects the dust carried out of the drier with the vapor and permits the vapor to continue on through the dust collector to the condenser or other apparatus providing the vacuum in the drier. The dust collector, as shown, is particularly designed so that its inlet pipe may be readily cleaned from the inside of the drier casing or from hand hole in an elbow bolted to the bottom of the vapor opening on the collector.

In the accompanying drawings:

Figure 1 is a side elevation, partly in section, of a vacuum drier made in accordance with the present invention.

Figure 2 is an end view thereof viewed from the right hand end of Fig. 1.

Figure 3 is a vertical transverse section.

Figure 4 is a fragmentary vertical longitudinal section through the double discharge valve the section being taken on line 4—4, Fig. 3.

Figure 5 is a fragmentary section taken on line 5—5, Fig. 4.

Figure 6 is a fragmentary vertical section taken on line 6—6, Fig. 4.

Figure 7 is a fragmentary enlarged view of the feeding pan, this view being similar to Fig. 3.

Figure 8 is an enlarged longitudinal section taken on line 8—8, Fig. 7.

Figure 9 is a view similar to Fig. 7 showing the feed pan in dumping position.

Figure 10 is a horizontal section taken on line 10—10, Fig. 8.

Figure 11 is a vertical section taken on line 11—11, Fig. 8.

Figure 12 is a horizontal section taken on line 12—12, Fig. 8.

Figure 13 is a view similar to Figs. 7 and 9 and showing a modified form of the pan lowering and adjusting device.

Figure 14 is a view similar to Fig. 13 showing the feed pan in dumping position.

Figure 15 is a perspective view of a part of the mechanism for dumping the feed pan in accordance with the form of the invention shown in Figs. 13 and 14.

Figure 16 is a section taken on line 16—16, Fig. 15.

Figure 17 is an enlarged view similar to Fig. 3 and showing the scraper knife and its associated mechanism in cross section, the same being taken on line 17—17, Fig. 20.

Figure 18 is a section taken on line 18—18, Fig. 20.

Figure 19 is a fragmentary perspective view of the scraper knife shown in Figs. 18—20.

Figure 20 is a vertical, fragmentary, longitudinal section through the drier showing the scraper knife and its associated mechanism partly in elevation.

Figure 21 is a vertical, longitudinal section through the dust collector used in connection with the vacuum drier.

Figure 22 is a horizontal section taken on line 22—22, Fig. 21.

The drying drum indicated generally at 25 is arranged within a casing indicated generally at 26 which forms a vacuum chamber 27 around the drying drum 25. The casing 26 includes a lower or base portion 28 which forms a trough 29 for the excess liquid fed to the drying drum and this excess is pumped out through an outlet 30 at the bottom of the trough 29. Connected to the front and rear sides of the base 28 is a shell 31 which, as best shown in Fig. 3, extends around the top of the drying drum 25 and is provided with suitable reinforcing ribs 32. One end of the casing 26 is enclosed by a head 33 which is connected in any suitable manner to the ends of the shell 31 and the base 28 and the opposite end of the casing 26 is enclosed by a head 34 which is connected to the opposite ends of the shell 31 and the base 28. The drum 25 is composed of a cylindrical shell 35 which is enclosed at its opposite ends by means of end heads 36, these end heads each having suitable trunnions which are journalled in the end heads 33 and 35. In the form of vacuum drier shown steam is introduced into the interior of the drum 25 by means of a steam inlet pipe 37 which extends through a stuffing box in the end of the drum spindle, and is connected to a steam line (not shown), and the condensate at the bottom of the drum 25 is caught by a scoop 39 and delivered out through a pipe 40 and a pipe 41 extending through the stuffing box in the opposite trunnion. The pipe 41 is connected to a condensate outlet line (not shown). The power for rotating the drum 25 is derived from a pulley 42 which is mounted on a longitudinal shaft 43, this shaft being journalled in suitable bearings 44 and 45 on the end heads 33 and 34 of the casing 26. To the opposite end of the drive shaft 43 is secured a pinion 46 which meshes with a large gear 47, this large gear being fastened to a shaft 48 journalled on the end head 34 of the drier casing. To the shaft 48 is also fixed a pinion 49 which meshes with a large gear 50, this gear 50 being keyed to the drum spindle. It is therefore apparent that as the pulley 42 is driven, through the train of gears 46, 47, 49 and 50, the drum 25 is rotated continuously. The liquid to be dried is admitted through a connection in the casing 26, to the trough 29 and is circulated by a pump through a liquor pipe 51 to the pan 56, this liquor pipe 51, as best shown in Fig. 3, being formed integrally with the trough 29 of the base 28 and extending therethrough. The liquor from this pipe 51 is conducted through a vertical pipe 52 which communicates with the interior of a horizontal longitudinal feed line or pipe 53. The ends of the horizontal feed pipe 53 are closed and in the upper part thereof is formed a slot 54 through which the liquid to be dried is fed to the stationary part 55 of a feed pan indicated generally at 56. As best shown in Fig. 7 the stationary part 55 of the feed pan is composed of end heads 57 and a longitudinal side 58 on the front side of the pipe 53. To the rear side of the stationary part 55 of the feed pan the movable part 59 of the feed pan is hinged as indicated at 60. This movable part consists of a cast metal section which is dropped or lowered from its normal position adjacent the face of the drum 25 and is so formed, as indicated at 61, that when it is in its normal elevated position it forms a relatively tight joint with the stationary part 55 of the feed pan so that there is no substantial leakage of the liquid from the feed pan except through the overflow space along the edge of the movable part 59.

In the form of the invention shown in Figs. 1–12 the movable part 59 of the feed pan is normally held in its elevated position, shown in Fig. 7, by means of a plurality of links or rods 62 each having a turnbuckle 63 and connecting the movable part 59 of the feed pan with a plurality of arms 64 on a rock shaft 65. This rock shaft 65, as best shown in Fig. 8, is journalled at its ends in the end heads 33 and 34 of the casing and externally of the casing 26 has secured thereto an operating handle 66 which swings vertically. In the normal elevated position of the movable part 59 of the feed pan the handle 66 is arranged vertically and is disposed in a U-shaped bracket 67 having a hand wheel 68, this hand wheel 68 operating a screw which screws against the outer side of the handle 66 and holds it in its horizontal elevated position in which the movable part 59 of the feed pan is likewise in a horizontal elevated position.

In the normal operation of the feed pan 56 the part 59 is elevated as shown in Fig. 7. In this position the liquid entering the pan through the inlet 51, pipe 52, horizontal line 53, and slot 54 engages the under side of the drum 25 which dips into the pan 56 and adheres thereto. At times lumps may occur in the liquid feed to the pan 56 and since the drum travels in the direction of the arrow in Fig. 7 these lumps are carried onto the movable part 59 of the feed pan 56 and accumulate between the drum and this movable part 59 of the feed pan. In time these lumps would interfere with the operation of the drier and when they have accumulated a sufficient extent the operator loosens the hand wheel 68 thereby releasing the handle 66 and lowers this handle to its dotted line position shown in Fig. 2. This rotates the rock shaft 65 clockwise as viewed in Fig. 7 and draws down the rock arm 64 and rods 62 thereby lowering the movable part 59 of the pan 56 to the position shown in Fig. 9. In this position the fluid washes over the lower edge of the movable part 59 of the pan and any lumps in the liquid or on this movable part 59 of the pan are washed over into the trough 29 formed by the base 28 of the casing 29.

The operator then raises the lever 66 to the full line position shown in Fig. 2, and tightens the hand wheel and screw 68 to hold it in its position. This rotates the shaft 65 and rock arms 64 clockwise and raises the rods 62 and movable section 59 of the feed pan 56 to its normal operative elevated position shown in Fig. 7. It is sometimes desirable in dealing with different materials to adjust the position of the movable section 59 of the feed pan 56 relative to the face of the drying drum 25. As this is only done when changing from the drying of one type of liquid to another, it is effected from the inside of the drying chamber 27 by adjustment of the turnbuckles 63.

In Figs. 13–16 is shown a modified form of the means for lowering the movable part 59 of the feed pan 56 for dumping any lumpy liquid collected in the feed pan. This form requires entry into the vacuum chamber 27 and includes a plurality of rods 69 each having a turnbuckle 70, these rods being pivotally connected to the movable part 59 of the feed pan 56 and at their lower ends being each pivotally connected to an arm 71 pivoted at 72 to a stationary arm 73. The upper end of each of the arms 71 is U-shaped in cross section and to hold each of the rods 69 in fixed relation to its arm 71 a collar 74 is secured to the rod 69 and held in position by a set screw 75. On one side the collar 74 has a depending finger 76 which engages the side of the arm 71 opposite from the opening slot 77. In the normal elevated position of the movable section 59 of the pan 56 each of the arms 71 and its rod 69 are held in fixed relative positions as shown in Fig. 13. When it is desired to lower the movable part 59 of the pan 56 the operator enters the vacuum chamber 27, loosens the said screw 75 and raises the collar 74 to the dotted line position shown in Fig. 15. Upon then drawing the arm 71 counter clockwise, as viewed in Figs. 13 and 15, the corresponding rod 69 is drawn out through the slot 74, and lowers with each of the arms 71 and movable part 59 of the feed pan 56 to the position shown in Fig. 14. In this position of the feed pan the liquor flows over the same and washes any accumulated lumps to the trough 29 at the bottom of the vacuum chamber 27.

The heated drum 25 in dipping down into the bath of liquid contained in the feed pan 56 picks up a film of this liquid. It is therefore desirable to spread out this film into the form of a uniform layer and for this purpose a spreader blade 78 is provided. This spreader blade, as shown in Fig. 9, is rigidly mounted at the tops of a plurality of rock arms 79 which are fixed to a rock shaft 80. This rock shaft, as best shown in Fig. 8, is journalled at its opposite ends in the end heads 33 and 34 of the casing 26 and on the outside of this casing and adjacent the end head 34 carries a handle 81. This handle swings into a U-shaped bracket 82 which is carried on the end head 34 and is held in position by a hand wheel and screw 83, as best shown in Fig. 10. In order to permit of adjusting the position of the scraper blade 78 with reference to the surface of the drying drum 25 the handle 81 is loosely mounted at the outer end of the rock shaft 80 and is connected by a double screw 84 with an arm 85, this arm 85 being connected with the rock shaft 80 by means of a key 86. In operation, the operator first raises the handle 81 and engages it with the hand wheel and screw 83 to hold it in position In this position of the handle 81 the scraper blade 78 is elevated into its operative position. He then turns the double screw 84 until the scraper blade 78 is adjusted to provide the exact clearance desired between the scraper blade 78 and the surface of the drum. After this adjustment is effected he can raise or lower the handle 81 at will to raise or lower the scraper blade 78 and each time the scraper blade 78 is brought back to its proper adjusted position relative to the surface of the drum. At times it is desirable to clean out the horizontal pipe 53 forming part of the feed trough 56 for feeding the liquor to the drum 25. To permit of so cleaning out this horizontal slotted pipe 53, the ends of this pipe project into the end heads 33 and 34 of the main casing as best shown in Fig. 8 and registering with the open ends of the pipe 53 each of the end heads 33 and 34 of the main casing is provided with an opening 110. Each of these openings 110 is normally closed by a closure consisting of a door 111 which is provided with a gasket 112, this gasket being interposed between the door 111 and the opening 110 so that a sealed joint is provided against the escape of liquor past the door 111. At its center, as indicated at 113, the door is pivoted to an arm 114, which, as best shown in Fig. 2, is pivoted to the corresponding end head 33 or 34 of the main casing, as indicated at 115, and extends across the door 111. At its opposite or outer end this arm 114 can be adjustably secured to the corresponding end head 33 or 34 of the main casing in any suitable manner, as indicated at 116. When it is required that the pipe 53 forming part of the feeding trough 56 be cleaned out, the operator loosens each of the fastenings 116 at the opposite end heads 33 and 34 of the main casing and opens the doors 111. He can then clean out the pipe 53 from its opposite ends and after this pipe is cleaned he can close the doors 111 and tighten the fastenings 116 so as to prevent the accidental escape of liquor at the ends of the pipe 53.

The film of liquor picked up by the drum 25 in the feed pan 56 and spread into a uniform layer by the spreader blade 79 passes around with the drum 25 and since this drum is heated this film is dried. When the dried film passes around to the opposite or front side of the heated drum 25 it is scraped off into a trough 90 which is formed as a part of the casing 26, as best shown in Fig. 3. The scraping off of the film of the dried material into the trough 90 is effected by a knife having a lowering and adjusting mounting which are preferably constructed as follows:

The blade 90 of the knife is in the form of a flat metal plate having one edge sharpened as at 91, Fig. 19. This blade is held against one side of a cast metal blade holder 92 by a backing plate 93, the scraper blade 90 being clamped between these parts by a plurality of screws 94 which pass through the backing plate 93 and screw into the blade holder 92. The blade holder 92 is provided with a plurality of arms 95 which are loosely pivoted to a rod 96. Fast to the rod 96 are mounted a plurality of arms 97 each of the arms 97 being arranged adjacent one of the arms 95 which carry blade holder 92. On the upper or outer end of each of the arms 97 is pivotally mounted a screw 98, these screws 98 being mounted for vertical movement and extending through openings provided in the blade holder 92 and the backing plate 93. Each of the screws 98 engages a nut 99, each of these nuts having a head 100 which fits into a recess provided in the blade holder 92. The nuts 99 are preferably squared so that they can be turned from the exterior of the backing plate 93. It will be apparent that with this organization and assuming the rock shaft 96 to be held in a fixed position upon turning the nuts 99 the blade holder 92 and the blade 90 carried thereby can be adjusted toward and from the drum at different points of their length. By this means, if it should be discovered that at the center the blade 90 is not scraping off the dried material the corresponding nuts 99 can be turned so as to draw up the blade 90 and blade holder 92 at this place and effect a complete scraping of the surface of the heated drum 25 for its full length.

In order to prevent the dried sheets of material or particles thereof from accumulating on the rock shaft 96 or any part of the blade holder or backing plate a shield 101 is preferably provided which encloses these parts. This shield comprises a flexible metal plate which extends the entire length of the blade 90 and its blade holder 92 and fits at its upper edge in a groove 103 in the outer face of the backing plate 93. The lower edge of this guard plate 101 is adapted to be sprung into and be held by a metal retaining clip 104 secured to each of the arms 95 which carry the blade holder 92. By so springing the plate 101 between the groove 103 and the clips 104 it is apparent that it is held in a position in which it completely protects and prevents the sheet of dried material scraped off by the blade 91 from coming in contact with the rock shaft 96 or of any of the screws, nuts or other parts carried thereby.

The rock shaft 96 is carried by suitable bearings 105 secured to the trough 116 and at its opposite ends is journalled in bearings provided in the end heads 33 and 34. At at least one end a segmental worm gear 106 is secured to this shaft 96 and this segmental worm gear meshes with a worm 107 carried by a transverse shaft 108. This shaft 108 is suitably journalled on the casing 26 and, as best shown in Fig. 2, carries a hand wheel 109 by means of which the worm 107 is rotated thereby rotating the shaft 96 and moving the blade 90 toward and from the drum 25 through the medium of the arm 97, screw 98, nut 99 and blade holder 92, as best shown in Fig. 19.

The sheet of dried material scraped off by the knife 90 falls into the trough 116 at the bottom of which is a horizontal screw conveyor, indicated generally at 117. This conveyor 117 consists of a shaft 118 carrying a screw blade 119 at one end and a screw blade 120 at its opposite end, these screw blades 119 and 120 being in opposition to one another so that the material is conveyed by the screw conveyor 117 toward the center of the drier. The shaft 118 is journalled at its ends in the end heads 33 and 34 of the main casing or housing 26 and can be continuously rotated in any suitable manner (not shown) preferably in synchronism with the operation of a drive for the drying drum 25.

At the center of the trough 89 an opening 121 is provided through which the dried material conveyed by the double screw conveyor 117 drops. This opening 121, as best shown in Fig. 4, is provided with a double valve which leads to two collecting receivers by means of which the dried material can be continuously removed without interfering with the operation of the drier. This double valve and its associated receivers is preferably constructed as follows:

Secured to the conveyor trough immediately under the opening 121 is a cast metal valve section 122 which contains the valve mechanism. This valve section 122 has two outlets 123 and 124 each of which is surrounded on its under side by a packing 125 and closed by a valve plate 126 which rises into engagement with the packing 125. To the center of this plate is pivoted an arm 127 which is fast to a rock shaft 128. This rock shaft 128 extends through the sides of the valve section 122 and outside of the valve section has secured thereto a counter-balancing and operating arm 129 weighted by a counter-weight 130. Immediately below each of the valves 126 a passage 131 is provided which leads to a receiver 132. It is therefore apparent that as the valves 126 are alternately opened the dried material from the conveyor is discharged into one or the other of the receivers 132 and that upon closing either of the valves 126 the receivers 132 can be emptied without breaking the vacuum in the drier. In order to direct the dried material from the conveyor into one or the other of the valved openings 123 or 124 a slide 133 is mounted on a pair of horizontal angle irons or rails 134 immediately under the opening 121 and arranged so that it can be moved to cover one or the other of the openings 123 or 124 and thereby direct the dried material into one or the other of these openings. The means for moving the slide valve comprises a horizontal rack 135 secured to the under side of the slide 133 and engaging a pinion 136 on a shaft 137. This shaft extends through the sides of the valve section 122 and outside of this section is provided with an operating handle 138 by means of which the pinion 136 is turned and the rack 135 operated to move the slide 133 from one extreme position to the other.

Each of the reservoirs is open on its under side and its open under side is provided with a gasket 139. Each of these gaskets 139 is engaged by a closure or valve plate 140 which is pivoted at its center to an operating arm 141. This operating arm is hinged at one end as indicated at 142 to the side of its receiver 132 and at its opposite end carries a sheave 143. A chain 144 passes around this sheave 143 and also around the drum 145 of a worm and worm gear winch 146. This winch is suitably secured to the corresponding receiver 132 and is operated by a handle 147 connected to the worm shaft.

In operation, the operator throws the slide valve 133 to cover one of the openings, say the openings 124, and opens the valve 126. The dried materials therefore fall through the opening 123 directly into the receiver 132 on the left hand side, as viewed in Fig. 4. When this receiver 132 is filled he throws the slide valve 133 in the opposite direction, closes the valve 126 under the opening 123 and opens the valve 126 under the opening 124. The dried material therefore falls through the opening 124 directly into the receiver 132 on the right hand side, as viewed in Fig. 4. He then operates the winch of the left hand receiver to open the valve or closure 140 at the bottom of the left hand receiver and permits the dried contents of this receiver to fall out. At the same time the vacuum in the drier is not broken since the valve 126 and the gasket 125 under the opening 123 effectively prevent leakage of air past the opening 123 to break the vacuum in the receiver. The operator then closes the closure 140 under the left hand reservoir 142 and when the other reservoir is filled repeats the discharging process as described. The vapor driven off the drying material on the drum must be withdrawn from the chamber 27 and in doing so it is desirable to collect and save any dust which otherwise would pass off with this vapor. For this purpose a dust collector, indicated generally at 150, is provided which is preferably constructed as follows:

In one side of the enclosing casing 26 a pair of vapor outlets 151 are provided and to the flange of each vapor outlet 151 is secured an upstanding elbow 152. At the outer turn of the elbow 152 a hand hole 153 is provided for cleaning out the dust separator as hereinafter described. To the upper end of each of the elbows 152 a plate 154 is removably secured and between this plate 154 and the elbow 152 is removably secured a standing pipe 155 which is open at its upper end. Each of these pipes 155 extends up into a horizontal cylinder 156, this cylinder being supported on the plates 154 and being provided with openings 157 at its opposite ends, these openings being normally closed by air tight closures 158. In the cylinder 156 is arranged a body of liquid 159 which is of substantial depth. A cap 160 covers each of the pipes 155 and is supported therefrom by rods 161 which are secured to the sides of the pipe 155 and project through the cap 160. At the upper ends of these rods wing nuts 162 are provided for holding the cap 160 in position on the rods 161. The lower end of each of the caps 160 dips into the liquid 159 so that the vapor and any entrained dust rising through the pipe 155 must pass down between the cap 160 and the pipe 155 and is precipitated in the liquid 159. In so doing the dust is left in the liquid 159. It will be noted that by this construction the pipe 155 is very easily kept in a clean condition since it can be directly cleaned out by opening the clean out covers 153 after which the interior of the pipe 155 is directly accessible. This constitutes a substantial advantage over previous dust collectors of this type in which the inlet pipes to the dust collector were very difficult to get at and clean out and thus provided an obstacle for the use of vacuum driers of this type for food products. The vapor from which the dust has been separated is drawn out of the separator shell 156 through a vapor outlet opening 163 to a condenser or other suitable discharging means. The liquid 159 in the dust collector gradually becomes loaded with dust separated out and this liquid is removed through a water outlet pipe 164.

As a whole this invention provides a vacuum drier which is very easily kept in a clean and sanitary condition. It is extremely simple considering the function which it performs and inexpensive in construction and operation; the materials can be readily removed from the drier without breaking the vacuum therein and it is also very easy to dump the feeding pan without entering the drier casing and breaking the vacuum; the means for scraping the dried material from the drums are also extremely simple in construction, contain no parts which are liable to collect dried material, and can also be readily adjusted from the exterior of the housing or casing without breaking the vacuum. All the parts of the apparatus, including the dust separator, are also easily accessible for cleaning, adjustment and repairs, and render the vacuum drier particularly adaptable for use in drying food products which require the utmost in cleanliness.

We claim as our invention:

1. In a drier, a drying drum, means for rotating said drum, a pan into which said drum dips, said pan including a stationary section and a movable section, means for admitting the liquid material to be dried to said pan, means for lowering said movable section to dump the material from said pan, means for heating said material picked up by said drum from said pan, and means for removing the dried material from said drum.

2. In a drier, a drying drum, means for rotating said drum, a pan into which said drum dips, said pan including a stationary section and a movable section pivoted for vertical movement relative to said stationary section, means for admitting the liquid to be dried to said pan, means for supporting said movable section in its elevated operative position relative to the stationary section, means for actuating said supporting means to lower said movable section and dump the material from said pan, means for heating said material picked up by said drum from said pan and means for removing the dried material from said drum.

3. In a drier, a drying drum, means for rotating said drum, a pan into which said drum dips, said pan including a stationary section and a movable section, said drum first traversing said stationary section and passing in closely spaced relation to the opposite rim of said movable section, means for admitting the liquid to be dried to said pan, means for supporting said movable section in its elevated operative position relative to the stationary section, means for actuating said supporting means to lower said movable section and dump the material from said pan, means for heating said material picked up by said drum from said pan and means for removing the dried material from said drum.

4. In a drier, a drying drum, means for rotating said drum, a pan into which said drum dips, said pan including a stationary section and a movable section, a supply pipe connected to said stationary section and through which the liquid to be dried is admitted to said pan, means for supporting said movable section in its elevated operative position relative to the stationary section, means for actuating said supporting means to lower said movable section and dump the material from said pan, means for heating the material picked up by said drum from said pan and means for removing the dried material from said drum.

5. In a vacuum drier, a drying drum, means for rotating said drum, a shell surrounding said drum, means for maintaining sub-atmospheric pressures in said shell, a pan into which said drum dips, said pan including a stationary section and a movable section pivotally connected to raise and lower into and out of operative relation with said stationary section to dump the contents of said pan, means for admitting the liquid to be dried to said pan, a rock shaft journalled in said shell, means connecting said rock shaft and movable section whereby upon rocking said rock shaft, said movable section is moved into and out of operative position, means outside of said shell for rocking said rock shaft, means for heating the material picked up by said drum from said pan and means for removing the dried material from said drum.

6. In a vacuum drier, a drying drum, means for rotating said drum, a shell surrounding said drum, means for maintaining sub-atmospheric pressures in said shell, a pan into which said drum dips, said pan including a stationary section and a movable section pivotally connected to raise and lower into and out of operative relation with said stationary section to dump the contents of said pan, means for admitting the liquid to be dried to said pan, a rock shaft journalled in said shell, a rock arm on said rock shaft within said shell, a link connecting said movable section and said rock arm whereby upon rocking said rock shaft said movable section is moved into and out of operative position, means outside of said shell for rocking said rock shaft, means for heating the material picked up by said drum from said pan and means for removing the dried material from said drum.

7. In a vacuum drier, a drying drum, means for rotating said drum, a shell surrounding said drum, means for maintaining sub-atmospheric pressures in said shell, a pan into which said drum dips, said pan including a stationary section and a movable section pivotally connected to raise and lower into and out of operative relation with said stationary section to dump the contents of said pan, means for admitting the liquid to be dried to said pan, a rock shaft journalled in said shell, a rock arm on said rock shaft within said shell below said movable section, a link of adjustable length connecting said movable section and said rock arm and arranged so that upon rocking said rock shaft in one direction said movable section is moved to its elevated position and said rock arm and link pass beyond their dead center, a lever outside of said shell for rocking said rock shaft, means for locking said lever in at least one extreme position, means for heating the material picked up by said drum from said pan and means for removing the dried material from said drum.

8. In a vacuum drier, a drying drum, means for rotating said drum, a shell surrounding said drum, means for maintaining sub-atmospheric pressures in said shell, a pan into which said drum dips, said pan including a stationary section and a movable section pivotally connected to raise and lower into and out of operative relation with said stationary section to dump the contents of said pan, an arm pivotally connected to a stationary part below said movable section, a link connecting the free end of said arm with said movable section whereby upon moving said pan upwardly the centers of said arm and link are brought substantially into line, means for latching said arm and link in said last named relation, means for heating the material picked up by said drum from said pan and means for removing the dried material from said drum.

9. In a vacuum drier, a drying drum, means for rotating said drum, a shell surrounding said drum, means for maintaining sub-atmospheric pressures in said shell, a pan into which said drum dips, said pan including a stationary section and a movable section pivotally connected to raise and lower into and out of operative relation with said stationary section to dump the contents of said pan, an arm pivotally connected to a stationary part below said movable section, a link of adjustable length connecting the free end of said arm with said movable section whereby upon moving the pan upwardly the centers of said arm and link are brought substantially into line and beyond dead center, a collar surrounding said link and movable into and out of engagement with the free end of said arm to latch the arm and link in said last named operative relation, means for heating the material picked up by said drum from said pan and means for removing the dried material from said drum.

10. In a vacuum drier, a drying drum, means for rotating said drum, a shell surrounding said drum, means for maintaining sub-atmospheric pressures in said shell, means for feeding the material to be dried to said drum, means for heating the material on said drum and means for scraping the dried material from said drum comprising a shaft extending through said shell and extending longitudinally of said drum, a blade holder pivotally mounted on said shaft, an arm fixed to said shaft, a blade on said holder adapted to engage said drum, means adjustably connecting said blade holder to said arm to permit of adjustment of said blade toward and from said drum and means outside of said shell for rocking said shaft.

11. In a vacuum drier, a drying drum, means for rotating said drum, a shell surrounding said drum, means for maintaining sub-atmospheric pressures in said shell, means for feeding the material to be dried to said drum, means for heating the material on said drum and means for scraping the dried material from said drum comprising a shaft extending through said shell and extending longitudinally of said drum, a blade holder pivotally mounted on said shaft, and arm fixed to said shaft, a blade on said holder adapted to engage said drum, a screw pivotally connected to said arm, a nut rotatably carried by said blade holder and engaging said screw, said screw and nut permitting of adjustment of said blade toward and from said drum and means outside of said shell for rocking said shaft comprising a worm wheel mounted on said shaft, a worm shaft carried by said shell adjacent said worm wheel, a hand wheel carried by said worm shaft and a worm carried by said worm shaft and engaging said worm wheel.

12. In a drier, a drying drum, means for rotating said drum, means for feeding the liquid material to be dried to said drum, means for heating the material on said drum and means for scraping the dried material from said drum comprising a scraping blade holder pivotally mounted for swinging movement toward and from said drum, a blade on said holder adapted to engage said drum, a relatively fixed member arranged adjacent said holder, screw means connecting said relatively fixed member and said holder to permit of adjustment of said blade toward and from said drum, and a removable shield sprung at its edges between shoulders formed on said blade holder and deflecting laterally outward the dried material scraped from said drum by said blade.

13. A vacuum drier, comprising a shell, means within said shell for drying materials, a conveyor receiving the dried material and adapted to convey the dried material to a depression in said shell, a pair of outlets being provided at the bottom of said depression, a receiver arranged below each of said outlets, a sealed closure for each of said outlets, a sealed closure for the open lower end of each of said receivers, a pair of horizontal rails provided at the sides of said depression, the ends of said rails extending only part way to the adjacent walls of said depression, a slide supported on said rails and movable alternately over each of said outlets and sliding beyond the ends of said rails to keep said rails clean, and rack and pinion means for moving said slide along said rails.

14. In a vacuum drier, a drying drum, means for rotating said drum, a shell surrounding said drum, means for maintaining sub-atmospheric pressures in said shell, a pan into which said drum dips, at least a part of said pan being pivotally connected to raise and lower into and out of operative relation with said drum to dump the contents of said pan, means for admitting the liquid to be dried to said pan, a rock shaft journalled in said shell, a rock arm on said rock shaft within said shell below said pan, a link of adjustable length connecting said pan and said rock arm and arranged so that upon rocking said rock shaft in one direction said pan is moved to its elevated position and said rock arm and link pass their dead center, a lever outside of said shell for rocking said rock shaft, means for locking said lever in at least one extreme position, means for heating the material picked up by said drum from said pan and means for removing the dried material from said drum.

15. In a vacuum drier, a drying drum, means for rotating said drum, a shell surrounding said drum, means for maintaining sub-atmospheric pressures in said shell, a pan into which said drum dips, at least a part of said pan being pivotally connected to raise and lower into and out of operative relation with said drum to dump the contents of said pan, an arm pivotally connected to a stationary part below said pan, a link of adjustable length connecting the free end of said arm with said pan whereby upon moving the pan upwardly the centers of said arm and link are brought substantially into line and beyond dead center, a collar surrounding said link and movable into and out of engagement with the free end of said arm to latch the arm and link in said last named operative relation, means for heating the material picked up by said drum from said pan and means for removing the dried material from said drum.

HENRY D. MILES.
DUNCAN BAIN MONTGOMERY.